United States Patent
Yu et al.

(10) Patent No.: US 11,960,172 B2
(45) Date of Patent: Apr. 16, 2024

(54) LIQUID CRYSTAL DISPLAY PANEL, METHOD FOR MANUFACTURING LIQUID CRYSTAL DISPLAY PANEL, AND CURVED DISPLAY

(71) Applicants: Huizhou China Star Optoelectronics Display Co., Ltd., Guangdong (CN); TCL China Star Optoelectronics Technology Co., Ltd., Guangdong (CN)

(72) Inventors: Liang Yu, Guangdong (CN); Feng Zheng, Guangdong (CN)

(73) Assignees: Huizhou China Star Optoelectronics Display Co., Ltd., Huizhou (CN); TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/435,135

(22) PCT Filed: Jul. 13, 2021

(86) PCT No.: PCT/CN2021/106010
§ 371 (c)(1),
(2) Date: Aug. 31, 2021

(87) PCT Pub. No.: WO2022/262041
PCT Pub. Date: Dec. 22, 2022

(65) Prior Publication Data
US 2024/0012292 A1 Jan. 11, 2024

(30) Foreign Application Priority Data
Jun. 16, 2021 (CN) .......................... 202110666175.6

(51) Int. Cl.
*G02F 1/1337* (2006.01)
(52) U.S. Cl.
CPC .. *G02F 1/133788* (2013.01); *G02F 1/133723* (2013.01); *G02F 1/133749* (2021.01); *G02F 1/133761* (2021.01)
(58) Field of Classification Search
CPC ......... G02F 1/133749; G02F 1/133761; G02F 1/133723
(Continued)

(56) References Cited

U.S. PATENT DOCUMENTS

2012/0314168 A1* 12/2012 Kang ................ G02F 1/133723
349/124
2016/0077384 A1 3/2016 Yang et al.
(Continued)

FOREIGN PATENT DOCUMENTS

CN 105425473 3/2016
CN 105572979 5/2016
(Continued)

*Primary Examiner* — Christopher M Raabe (57) ABSTRACT

The present application discloses a liquid crystal display panel, a method for manufacturing the liquid crystal display panel, and a curved display. The liquid crystal display panel is configured with an alignment layer only on an array substrate, but not on an opposing substrate opposite to the array substrate. After photo-alignment, a pretilt angle of liquid crystal molecules near the array substrate is greater than a pretilt angle of liquid crystal molecules near the opposing substrate to effectively mitigate a problem of "black clusters."

19 Claims, 5 Drawing Sheets

(58) Field of Classification Search
USPC .......................................................... 349/123
See application file for complete search history.

(56) References Cited

U.S. PATENT DOCUMENTS

2017/0184922 A1    6/2017  Park et al.
2023/0418110 A1*  12/2023  Che ................... G02F 1/133746

FOREIGN PATENT DOCUMENTS

| CN | 106405944 | 2/2017 |
| CN | 108897173 | 11/2018 |
| CN | 109426037 | 3/2019 |
| CN | 111025775 | 4/2020 |
| CN | 111240100 | 6/2020 |
| CN | 111552121 | 8/2020 |
| CN | 112666759 | 4/2021 |

\* cited by examiner

Providing an array substrate, an opposing substrate, and a self-alignment liquid crystal material, wherein the array substrate and the opposing substrate are configured to be opposite to each other — B1

Forming an alignment layer on a side of the array substrate — B2

Injecting the self-alignment liquid crystal material between the array substrate and the opposing substrate — B3

Aligning the self-alignment liquid crystal material to form a liquid crystal layer, wherein the liquid crystal layer includes first liquid crystal molecules and second liquid crystal molecules, the first liquid crystal molecules are located on a side of the liquid crystal layer near the array substrate, and the second liquid crystal molecules are located on a side of the liquid crystal layer near the opposed substrate, an acute angle between a major axis of the first liquid crystal molecules and a vertical direction is a first pretilt angle, an acute angle between a major axis of the second liquid crystal molecules and the vertical direction is a second pretilt angle, and the first pretilt angle is greater than the second pretilt angle — B4

LIQUID CRYSTAL DISPLAY PANEL, METHOD FOR MANUFACTURING LIQUID CRYSTAL DISPLAY PANEL, AND CURVED DISPLAY

RELATED APPLICATIONS

This application is a National Phase of PCT Patent Application No. PCT/CN2021/106010 having International filing date of Jul. 13, 2021, which claims the benefit of priority of Chinese Patent Application No. 20211066175.6 filed on Jun. 16, 2021. The contents of the above applications are all incorporated by reference as if fully set forth herein in their entirety.

FIELD AND BACKGROUND OF THE INVENTION

The present application relates to a technical field of displays, and particularly to a liquid crystal display panel, a method for manufacturing the liquid crystal display panel, and a curved display.

In a field of display technologies, development of flat-panel display technologies is the most mature one. However, with rapid development of display technologies, other types of displays (such as curved displays, foldable displays, etc.) have appeared one after another to meet users' diverse needs. Compared with flat-panel displays, the curved displays have wider viewing angles and wider field of view, and have advantages of imparting strong three-dimensionality, providing vivid images, and presenting smooth and beautiful curved appearance, thereby giving the users a better visual experience.

Current curved displays are generally combinations of conventional flat display panels and curved backlight modules. Most widely used flat display panels in curved displays are vertical alignment (VA) type liquid crystal display panels. Some studies have found that after the current VA type liquid crystal display panels are bent, obvious "black clusters" will appear on both sides of bending areas, resulting in a problem of an uneven brightness (Mura) of overall display, which gives rise to negative impacts on display quality of the curved displays.

Therefore, it is necessary to develop a liquid crystal display panel, a method for manufacturing the liquid crystal display panel, and a curved display to overcome "black clusters" problems existing in the current curved displays.

SUMMARY OF THE INVENTION

An object of the present application is to addresses the deficiency in prior art and provide a liquid crystal display panel, a method for manufacturing a liquid crystal display panel, and a curved display to overcome a problem of "black clusters" of curved displays.

In a first aspect, the present application provides a liquid crystal display panel. The liquid crystal display panel comprises: an array substrate; an opposing substrate disposed opposite to the array substrate; a liquid crystal layer made of a self-alignment liquid crystal material and disposed between the array substrate and the opposing substrate, the liquid crystal layer comprises first liquid crystal molecules and second liquid crystal molecules, the first liquid crystal molecules are located on a side of the liquid crystal layer near the array substrate, and the second liquid crystal molecules are located on a side of the liquid crystal layer near the opposing substrate; and an alignment layer only disposed on a side of the array substrate near the liquid crystal layer. An acute angle between a major axis of the first liquid crystal molecules and a vertical direction is a first pretilt angle, an acute angle between a major axis of the second liquid crystal molecules and the vertical direction is a second pretilt angle, and the first pretilt angle is greater than the second pretilt angle.

Further, a difference in degrees between the first pretilt angle and the second pretilt angle is greater than 1.8 degrees.

Further, the first pretilt angle is between 2.4 degrees and 4 degrees, and the second pretilt angle is between 0 degrees and 0.6 degrees.

Further, the self-alignment liquid crystal material comprises liquid crystal molecules, vertical aligning agents, and reactive monomers, the vertical aligning agents comprise a structure as shown by formula (1):

the reactive monomers comprise a structure as shown by formula (2):

Further, a mass fraction of the vertical aligning agents to the self-alignment liquid crystal material is between 0.3% and 0.6%, and a mass concentration of the reactive monomers in the self-alignment liquid crystal material is between 2000 parts per million (ppm) and 3000 ppm.

Further, the alignment layer is made of polyimide compounds having a main chain based on imides, and the polyimide compounds comprise reactive functional groups which make an angular velocity of the first pretilt angle faster than an angular velocity of the second pretilt angle.

Further, the reactive functional groups comprise at least one of unsaturated double bonds, unsaturated triple bonds, hydroxy groups, or amino groups.

In a second aspect, the present application provides a method for manufacturing a liquid crystal display panel. The method comprises: providing an array substrate, an opposing substrate, and a self-alignment liquid crystal material, wherein the array substrate and the opposing substrate are disposed opposite to each other; forming an alignment layer on a side of the array substrate near the opposing substrate; injecting the self-alignment liquid crystal material between the array substrate and the opposing substrate; and aligning the self-alignment liquid crystal material to form a liquid crystal layer, wherein the liquid crystal layer comprises first liquid crystal molecules and second liquid crystal molecules, the first liquid crystal molecules are located on a side of the liquid crystal layer near the array substrate, and the second liquid crystal molecules are located on a side of the liquid crystal layer near the opposing substrate, an acute angle between a major axis of the first liquid crystal molecules and a vertical direction is a first pretilt angle, an acute angle between a major axis of the second liquid crystal molecules and the vertical direction is a second pretilt angle. The first pretilt angle is greater than the second pretilt angle.

Further, the step of aligning the self-alignment liquid crystal material to form the liquid crystal layer comprises: irradiating the self-alignment liquid crystal material by ultraviolet light to make an angular velocity of the first pretilt angle faster than an angular velocity of the second pretilt angle.

Further, the irradiating the self-alignment liquid crystal material by ultraviolet light is performed under conditions of a light wavelength between 270 nanometers and 380 nanometers, and a light intensity between 0.5 milliwatts per square centimeter and 0.7 milliwatts per square centimeter.

Further, a difference between the angular velocity of the first pretilt angle and the angular velocity of the second pretilt angle is greater than or equal to 30 seconds per degree.

Further, the self-alignment liquid crystal material is irradiated by ultraviolet light with the light wavelength of 313 nanometers and the light intensity of 0.5 milliwatts per square centimeter to make the angular velocity of the first pretilt angle faster than or equal to 40 seconds per degree and the angular velocity of the second pretilt angle slower than or equal to 70 seconds per degree.

In a third aspect, the present application provides a curved display. The curved display comprises: a liquid crystal display panel; and a backlight module disposed on a side of the liquid crystal display panel away from a light output side. The liquid crystal display panel comprises: an array substrate; an opposing substrate disposed opposite to the array substrate; a liquid crystal layer, wherein a material of the liquid crystal layer is a self-alignment liquid crystal material, the liquid crystal layer is disposed between the array substrate and the opposing substrate, the liquid crystal layer comprises first liquid crystal molecules and second liquid crystal molecules, the first liquid crystal molecules are located on a side of the liquid crystal layer near the array substrate, and the second liquid crystal molecules are located on a side of the liquid crystal layer near the opposing substrate; and an alignment layer only disposed on a side of the array substrate near the liquid crystal layer. An acute angle between a major axis of the first liquid crystal molecules and a vertical direction is a first pretilt angle, an acute angle between a major axis of the second liquid crystal molecules and the vertical direction is a second pretilt angle, and the first pretilt angle is greater than the second pretilt angle.

Further, a difference in degrees between the first pretilt angle and the second pretilt angle is greater than 1.8 degrees.

Further, the first pretilt angle is between 2.4 degrees and 4 degrees, and the second pretilt angle is between 0 degrees and 0.6 degrees.

Further, the self-alignment liquid crystal material comprises liquid crystal molecules, vertical aligning agents, and reactive monomers, the vertical aligning agents comprise a structure as shown by formula (1):

the reactive monomers comprise a structure as shown by formula (2):

Further, a mass fraction of the vertical aligning agents to the self-alignment liquid crystal material is between 0.3% and 0.6%, and a mass concentration of the reactive monomers in the self-alignment liquid crystal material is between 2000 ppm and 3000 ppm.

Further, the alignment layer is made of polyimide compounds having a main chain based on imides, and the polyimide compounds comprise reactive functional groups to make an angular velocity of the first pretilt angle greater than an angular velocity of the second pretilt angle.

Further, the reactive functional groups comprise at least one of unsaturated double bonds, unsaturated triple bonds, hydroxy groups, or amino groups.

The present application has advantageous effects as follows: a liquid crystal display panel, a method for manufacturing a liquid crystal display panel, and a curved display are provided by the present application. The liquid crystal display panel is configured with an alignment layer only on an array substrate, but not on an opposing substrate. A material of the alignment layer is a fast responsive photo-alignment material and a liquid crystal material of the liquid crystal display panel is a self-alignment liquid crystal material with a slow angular velocity, which makes an angular velocity of liquid crystal molecules near the array substrate faster than an angular velocity of liquid crystal molecules near the opposing substrate during photo-alignment. As a result, after a liquid crystal layer is formed after the photo-alignment, a pretilt angle (first pretilt angle $\alpha$) of the liquid crystal molecules of the liquid crystal layer near the array substrate is greater than a pretilt angle (second pretilt angle $\beta$) of the liquid crystal molecules of the liquid crystal layer near the opposing substrate. Preferably, a difference in degrees between the first pretilt angle $\alpha$ and the second pretilt angle $\beta$ is greater than 1.8 degrees to compensate for the problem of the abnormal liquid crystal molecule alignment caused by misplacing of the liquid crystal molecules during bending of the liquid crystal display panel, so that a problem of "black clusters" is mitigated. The liquid crystal display panel can be applied to curved displays, especially high-end curved displays with curvatures of 1500 R and 1800 R, and has advantages of fast response time and ideal performance to improve the "black clusters" problem.

The method for manufacturing the liquid crystal display panel may use the fast responsive photo-alignment material as the material of the alignment layer and the self-alignment liquid crystal material with the slow angular velocity as the material of the liquid crystal layer to make the angular velocity of the first pretilt angle $\alpha$ greater than the angular velocity of the second pretilt angle $\beta$ during photo-alignment. Preferably, a difference between the angular velocity of the first pretilt angle $\alpha$ and the angular velocity of the second pretilt angle $\beta$ is greater than or equal to 30 seconds per degree to make the first pretilt angle $\alpha$ greater than the second pretilt angle $\beta$ after the photo-alignment.

DESCRIPTION OF SPECIFIC EMBODIMENTS OF THE INVENTION

The technical solutions in the embodiments of the present application will be clearly and completely described below in conjunction with the accompanying drawings in the embodiments of the present application. Obviously, the described embodiments are only a part of the embodiments of the present invention, rather than all the embodiments. Based on the embodiments of the present invention, all other embodiments obtained by those skilled in the art without creative work shall fall within the protection scope of the present invention.

Indicated position or positional relationship mentioned in the present application, for example, "on", "under", "front", "horizontal", "vertical", "side" etc., are the directions or positional relationship with reference to annexed drawings only to facilitate the description of the present application and simplify the description, rather than indicating or implying that the device or element referred to must have a specific orientation, or must be constructed and operated in a specific orientation; therefore are not construed to limit the present application.

The terms "first" and "second" are only used for descriptive purposes, and cannot be understood as indicating or implying relative importance or implicitly indicating the number of technical features referred to. Therefore, the features defined with "first" and "second" may explicitly or implicitly include one or more of the features. In the description of the present application, "a plurality of" means two or more than two, unless otherwise specifically defined.

The term "pretilt angle" refers to an acute angle between a major axis of liquid crystal molecules of a liquid crystal layer, which is formed after a self-alignment liquid crystal material in a liquid crystal display panel treated by photo-alignment, and a vertical direction. In the embodiments and experiment examples of the present application, the "first pretilt angle $\alpha$" refers to an acute angle between a major axis of liquid crystal molecules located on a side of the liquid crystal layer near an array substrate and the vertical direction; the "second pretilt angle $\beta$" refers to an acute angle between a major axis of liquid crystal molecules located on a side of a liquid crystal layer near an opposing substrate and the vertical direction.

The term "angular velocity" means the time need for irradiating by ultraviolet light to change one degree (1°) of the acute angle between the liquid crystal molecules and the vertical direction. The conditions of irradiation of the ultraviolet light are: a light wavelength between 270 nanometers (nm) and 380 nm, and a light intensity between 0.5 milliwatts per square centimeter (mW/cm$^2$) and 0.7 mW/cm$^2$. In the embodiments of the present applications, the angular velocity is characterized by seconds per degree. An angular velocity within a range faster than or equal to 40 seconds per degree is considered as a fast angular velocity. An angular velocity within a range slower than or equal to 70 seconds per degree is considered as a slow angular velocity. In addition, in the embodiments of the present applications, the conditions of irradiation of the ultraviolet light are: a light wavelength is 313 nm, and a light intensity is 0.5 mW/cm$^2$.

The terms "faster than" and "slower than" both do not include the number referred to.

The term "fast responsive photo-alignment material" means a category of material that can employ photo-alignment techniques to facilitate the formation of the pretilt angle of the liquid crystal molecules. In the embodiments of the present applications, under the irradiation of the ultraviolet light with the wavelength of 313 nm and the light intensity of 0.5 mW/cm$^2$, the fast responsive photo-alignment material can facilitate an angular velocity of the first pretilt angle α faster than or equal to 40 seconds per degree.

The term "slow responsive photo-alignment material" means a category of material that can employ photo-alignment techniques to slow formation of the pretilt angle of the liquid crystal molecules. In the embodiments of the present applications, under the irradiation of the ultraviolet light with the wavelength of 313 nm and the light intensity of 0.5 mW/cm$^2$, the slow responsive photo-alignment material can slow the angular velocity of the first pretilt angle α slower than or equal to 70 seconds per degree.

The terms "above" and "below" both include the number referred to.

Figure 1:
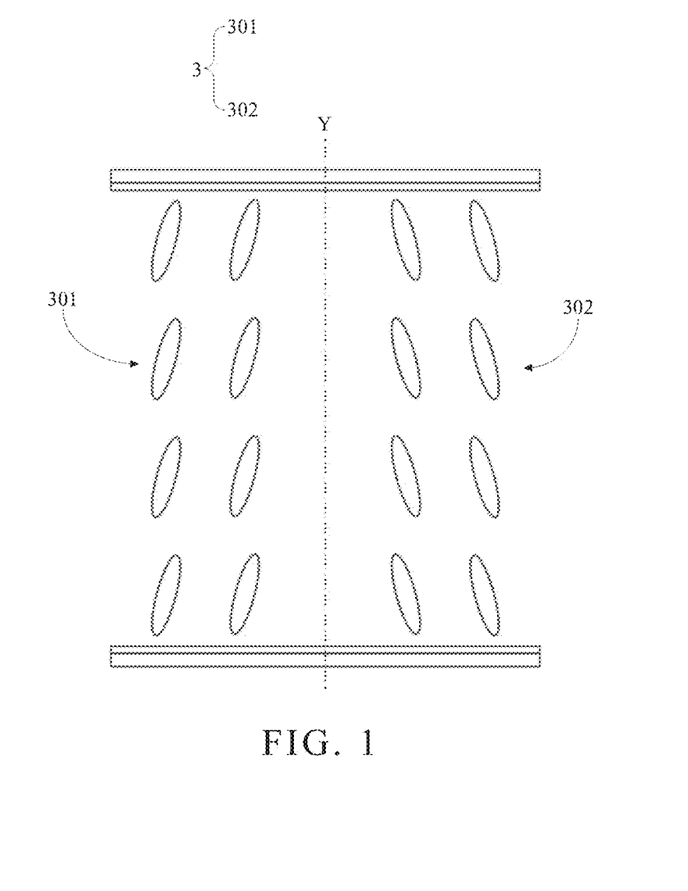
FIG. 1 is a schematic structural view of a liquid crystal display panel in a flat state with a "black clusters" phenomenon.
Figure 2:
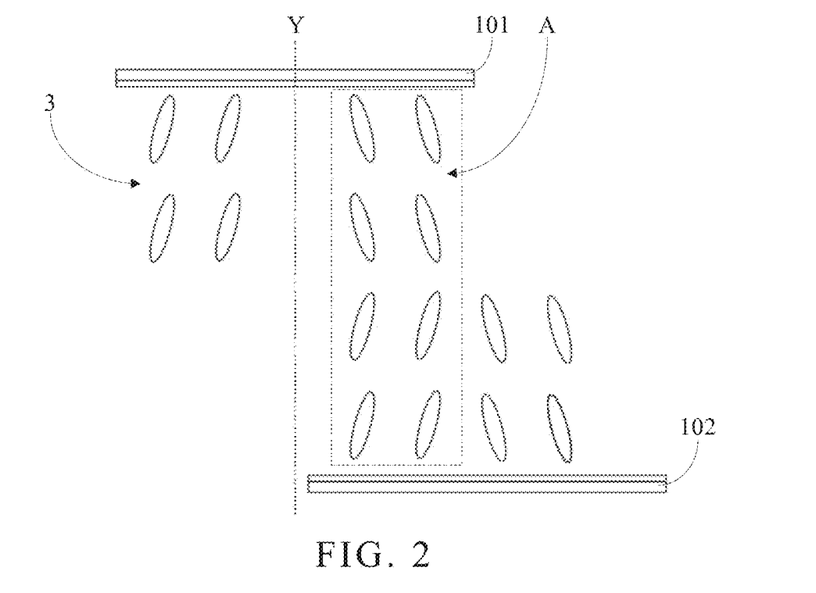
FIG. 2 is a schematic structural view of the liquid crystal display panel in a bent state with the "black clusters" phenomenon.

The term "black clusters" means a phenomenon of dark fringes of pixels. A main cause of "black clusters" is the abnormal alignment of liquid crystal molecules. Specifically, as shown in FIG. 1, a liquid crystal layer 3 includes a first region 301 and a second region 302. Before the liquid crystal layer 3 is energized, an arrangement of the liquid crystal molecules in the first region 301 and an arrangement of the liquid crystal molecules in the second region 302 is symmetrical with respect to a Y-axis, a deflection angle and a deflection direction of all the liquid crystal molecules in the first region 301 are consistent, and a deflection angle and a deflection direction of all the liquid crystal molecules in the second region 302 are consistent. Therefore, after the liquid crystal layer 3 is energized, a problem of liquid crystal molecule deflection disorder will not occur, so that a brightness of each area is consistent. As shown in FIG. 2, when a vertical alignment (VA) type liquid crystal display panel is bent, because a difference between a degree of bending of an upper portion substrate 101 and a degree of bending of a lower portion substrate 102 is present, there will be a relative displacement between the upper portion substrate 101 and the lower portion substrate 102, thereby causing misplacing between the liquid crystal molecules in different regions. As a result, an abnormal alignment of liquid crystal molecules occurs. That is, within a region A, liquid crystal molecules near the upper portion substrate 101 and liquid crystal molecules near the lower portion substrate 102 have different deflection directions; therefore, after the liquid crystal layer 3 is energized, the problem of liquid crystal molecule deflection disorder will occur, thereby producing dark fringes of pixels, which can be characterized as "black clusters."

Figure 3:
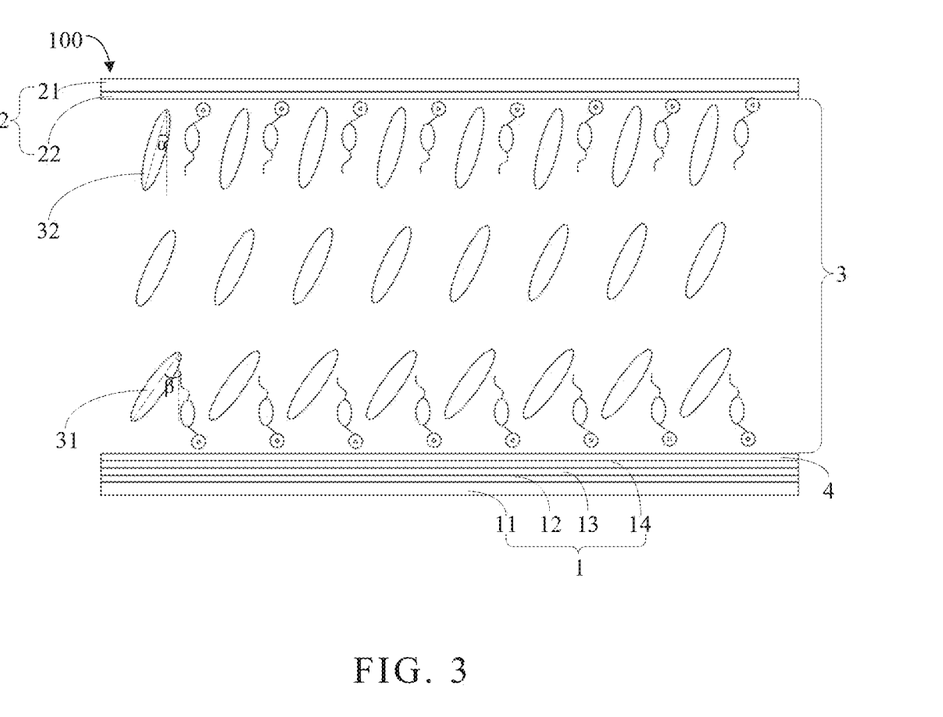
FIG. 3 is a schematic structural view of a liquid crystal display panel of one embodiment of the present application.

The present application provides a liquid crystal display panel capable of applying to a curved display to ameliorate the "black clusters" problem existing in current curved displays. As shown in FIG. 3, a liquid crystal display panel 100 includes an array substrate 1, an opposing substrate 2, a liquid crystal layer 3, and an alignment layer 4. The array substrate 1 and the opposing substrate 2 are disposed opposite to each other. The liquid crystal layer 3 is sandwiched between the array substrate 1 and the opposing substrate 2. The alignment layer 4 is disposed on a side of the array substrate 1 near the liquid crystal layer 3.

Specifically, the array substrate 1 may be disposed on a side of the liquid crystal display panel 100 away from a light output side of the liquid crystal display panel 100. A thin-film transistor (TFT) is integrated on the array substrate 1. The type of the array substrate 1 is not specifically limited and can be selected according to practical demands.

It should be noted that the array substrate 1 may also be disposed on the light output side of the liquid crystal display panel 100. The opposing substrate 2 may be a color filter (CF) substrate. The opposing substrate 2 may be a substrate without a color filter while the color filter is disposed on the array substrate 1.

Figure 4:
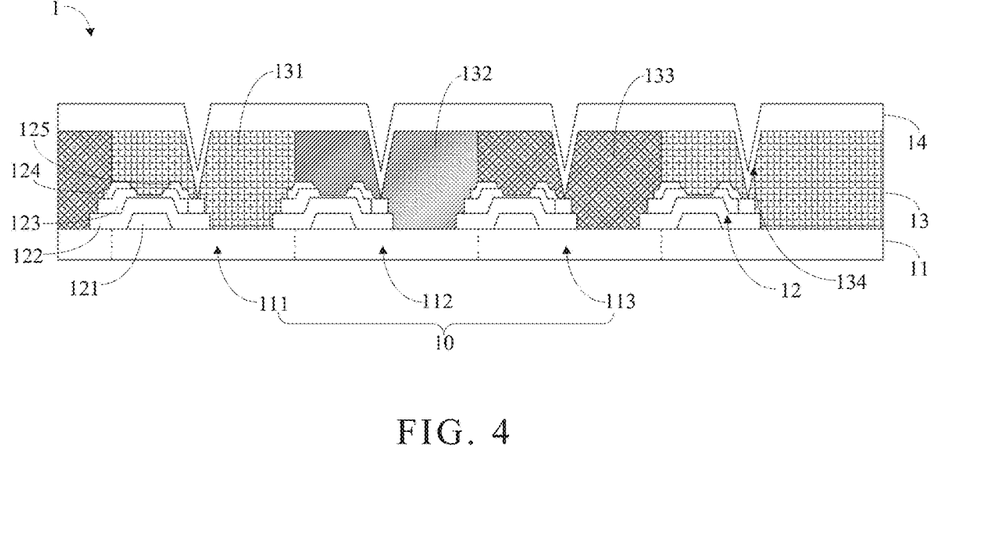
FIG. 4 is a schematic structural view of an array substrate of one embodiment of the present application.

Exemplarily, as shown in FIGS. 3 and 4, the array substrate 1 is a color filter on array (COA) substrate. The array substrate 1 includes a first substrate 11, a thin-film transistor (TFT) layer 12, a color photoresist layer 13, and a pixel electrode layer 14. The TFT layer 12 is disposed on the first substrate 11. The color photoresist layer 13 is disposed on a side of the TFT layer 12 away from the first substrate 11. The pixel electrode layer 14 is disposed on a side of the color photoresist layer 13 away from the TFT layer 12.

A material of the first substrate 11 is glass. The first substrate 11 is configured with a plurality of red sub-pixel regions 111, a plurality of blue sub-pixel regions 112, and a plurality of green sub-pixel regions 113. All the sub-pixel regions are configured to be arranged in a matrix, and one red sub-pixel region 111, one blue sub-pixel region 112, and one green sub-pixel region 113 collectively form a pixel unit 10.

The TFT layer 12 includes a plurality of thin-film transistors (TFT) arranged in a matrix, and each TFT corresponds to a sub-pixel region. Each TFT has a bottom gate structure and includes a gate 121 disposed on the first substrate 11, a gate insulating layer 122 disposed on the first substrate 11 and covering the gate 121, a semiconductor layer 123 disposed on the gate insulating layer 122, and a source 124 and a drain 125 disposed on the semiconductor layer 123.

The color photoresist layer 13 includes a plurality of red resists 131, a plurality of blue resists 132, and a plurality of green resists 133. The red resists 131 correspond to positions of the red sub-pixel regions 111. The blue resists 132 correspond to positions of the blue sub-pixel regions 112. The green resists 133 correspond to positions of the green sub-pixel regions 113. Under the irradiation of white light, the red resists 131, the blue resists 132, and the green resists 133 transmit red light, blue light, and green light, responsively and correspondingly. Each of the color resists corresponds to one of the TFTs, and each color resist configures a through hole 134 defined at an opposite position of the drain of the corresponding TFT.

The pixel electrode layer 14 is connected to the drain 125 through the through hole 134. A material of the pixel electrode layer 14 is a transparent metal oxide such as indium tin oxide (In2O3:Sn, ITO).

Those skilled in the art can understand that the TFT layer should also include other known structures, such as data lines, scanning lines, etc., and each TFT of the TFT layer can also be the bottom gate structure. The COA substrate may also include other known structures such as a black matrix layer. The embodiments of the present application do not specifically limit structures of the array substrate, and adaptive adjustments can be made according to needs.

Still referring to FIG. 3, the opposing substrate 2 is disposed on the light output side of the liquid crystal display panel 100. The opposing substrate 2 includes a second substrate 21 and a common electrode layer 22 disposed on a side of the second substrate 21 near the liquid crystal layer 3. A material of the second substrate 21 is glass. A material of the common electrode layer 22 is ITO.

The liquid crystal layer 3 includes first liquid crystal molecules 31 and second liquid crystal molecules 32. The first liquid crystal molecules 31 are located near a side of the array substrate 1 configuring the alignment layer 4. The second liquid crystal molecules 32 are located near a side of the opposing substrate 2 configuring the common electrode layer 22. A side of the common electrode layer 22 near the liquid crystal layer 3 does not include the alignment layer. A material of the liquid crystal layer 3 is a self-alignment liquid crystal (SA-LC) material. A first pretilt angle $\alpha$ of the first liquid crystal molecules 31 is formed by performing an initial alignment on the alignment layer 4. A second pretilt angle $\beta$ of the second liquid crystal molecules 32 is formed by completing the initial alignment under irradiation of ultraviolet light.

The first pretilt angle $\alpha$ is configured to be greater than the second pretilt angle $\beta$ to compensate for a problem of abnormal liquid crystal molecule alignment caused by misplacing of the liquid crystal molecules during bending of the liquid crystal display panel, so that the "black clusters" problem is mitigated. For curved displays with a curvature of 1500 R or 1800 R, the "black clusters" problem can be effectively mitigated by satisfying a condition that the first pretilt angle $\alpha$ is greater than the second pretilt angle $\beta$. For high-end curved displays with a curvature of 800 R or 1000 R, the "black clusters" problem cannot be effectively mitigated by only satisfying the condition that the first pretilt angle $\alpha$ is greater than the second pretilt angle $\beta$ due to those high-end curved displays usually require a faster response time. The condition to fulfill the requirement of the faster response time is that the second pretilt angle $\beta$ needs to be as small as possible after photo-alignment to maximize a difference in degrees between the first pretilt angle $\alpha$ and the second pretilt angle $\beta$. Preferably, the difference in degrees between the first pretilt angle $\alpha$ and the second pretilt angle $\beta$ is greater than 1.8 degrees.

Further, the first pretilt angle $\alpha$ is between 2.4 degrees and 4 degrees, and the second pretilt angle $\beta$ is between 0 degrees and 0.6 degrees.

In order to make the difference in degrees between the first pretilt angle $\alpha$ and the second pretilt angle $\beta$ greater than 1.8 degrees, technical means adopted in the embodiments of the present application are as follows: the alignment layer is disposed on the side of the array substrate 1 near the liquid crystal layer 3 and no alignment layer is disposed on a side of the opposing substrate 2 near the liquid crystal layer 3. A material of the alignment layer is a fast responsive photo-alignment material. In addition, the SA-LC material with a slow angular velocity is chosen as the material of the liquid crystal layer. As a result, under the same condition of photo-alignment, the angular velocity of the first pretilt angle $\alpha$ is fast and the angular velocity of the second pretilt angle $\beta$ is slow, so that the difference in degrees between the first pretilt angle $\alpha$ and the second pretilt angle $\beta$ is increased.

Further, under a condition of photo-alignment using the irradiation of the ultraviolet light of a wavelength between 270 nanometers (nm) and 380 nm and the light intensity between 0.5 milliwatts per square centimeter (mW/cm$^2$) and 0.7 mW/cm$^2$, a difference in angular velocity between the first pretilt angle $\alpha$ and the second pretilt angle $\beta$ is greater than or equal to 30 seconds per degree, so as to maximize the difference in degrees between the first pretilt angle $\alpha$ and the second pretilt angle $\beta$. Exemplarily, under the irradiation of the ultraviolet light of a wavelength 313 nm and a light intensity 0.5 mW/cm$^2$, the angular velocity of the first pretilt angle $\alpha$ is faster than or equal to 40 seconds per degree and the angular velocity of the second pretilt angle $\beta$ is slower than or equal to 70 seconds per degree (e.g., between 70 seconds per degree and 130 seconds per degree).

Further, a material of the alignment layer is polyimide compounds having a main chain based on imides, and a side chain of the polyimide compounds include reactive functional groups which make the angular velocity of the first pretilt angle $\alpha$ faster than the angular velocity of the second pretilt angle $\beta$.

Further, the reactive functional groups include at least one of unsaturated double bonds, unsaturated triple bonds, hydroxy groups, or amino groups.

Specifically, the material of the alignment layer is the fast responsive photo-alignment material such as commercial photo-aligned polyimide. For example, a product model number JSR2579 photo-aligned polyimide (purchased from JSR Co., Ltd.), and the product model number Nissan 4197 or Nissan 867 photo-aligned polyimide (purchased from Nissan Chemical Company, Japan). The fast responsive photo-alignment material may also be self-prepared photo-aligned polyimide. The main chain of the photo-aligned polyimide is based on imides. The angular velocity can be accelerated by adding high-density reactive functional groups (such as functional groups containing unsaturated bonds) on the side chains of the photo-aligned polyimide. A type and density of reactive groups are not specifically limited.

In the embodiments of the present application, the SA-LC material is composed of liquid crystal molecules, vertical aligning agents, and reactive monomers. The liquid crystal molecules are nematic liquid crystals. The vertical aligning agents include a structure as shown by formula (1):

(1)

and the reactive monomers include the structure as shown by formula (2):

(2)

Experiments have found that using the irradiation of the ultraviolet light of the wavelength of 313 nm and the light intensity of 0.5 mW/cm² to perform photo-alignment while a mass fraction of the vertical aligning agents to the SA-LC material is between 0.3% and 0.6%, and a mass concentration of the reactive monomers in the SA-LC material is between 2000 parts per million (ppm) and 3000 ppm, the angular velocity of the second pretilt angle β is slower than or equal to 70 seconds per degree. When the mass fraction of the vertical aligning agents to the SA-LC material is 0.6%, and the mass concentration of the reactive monomers in the SA-LC material is between 3000 ppm and 4000 ppm, the angular velocity of the second pretilt angle β is within a range between 40 seconds per degree and 70 seconds per degree. When the mass fraction of the vertical aligning agents to the SA-LC material is between 0.6% and 0.9%, and the mass concentration of the reactive monomers in the SA-LC material is between 4000 ppm and 6000 ppm, the angular velocity of the second pretilt angle β is faster than or equal to 40 seconds per degree.

It should be noted that when the material of the alignment layer is the aforementioned fast responsive photo-alignment material, and the material of the liquid crystal layer is the aforementioned SA-LC material, the angular velocity of the second pretilt angle β will be suppressed. For example, if there is no alignment layer, the pretilt angles of the first liquid crystal molecules and the second liquid crystal molecules both are self-aligned relying on irradiation, so that the angular velocity of the second pretilt angle β is between 70 seconds per degree and 95 seconds per degree. In contrast, when the fast responsive photo-alignment material is present in the alignment layer (only configures at the side of the liquid crystal layer near the array substrate), the angular velocity of the second pretilt angle β will be suppressed to 70 seconds per degree and 130 seconds per degree.

Those skilled in the art can understand that the liquid crystal display panel of the embodiments of the present application may also include some known structures, such as polarizers, protective cover plates, touch devices, etc., which can be set by those skilled in the art.

Figure 5:
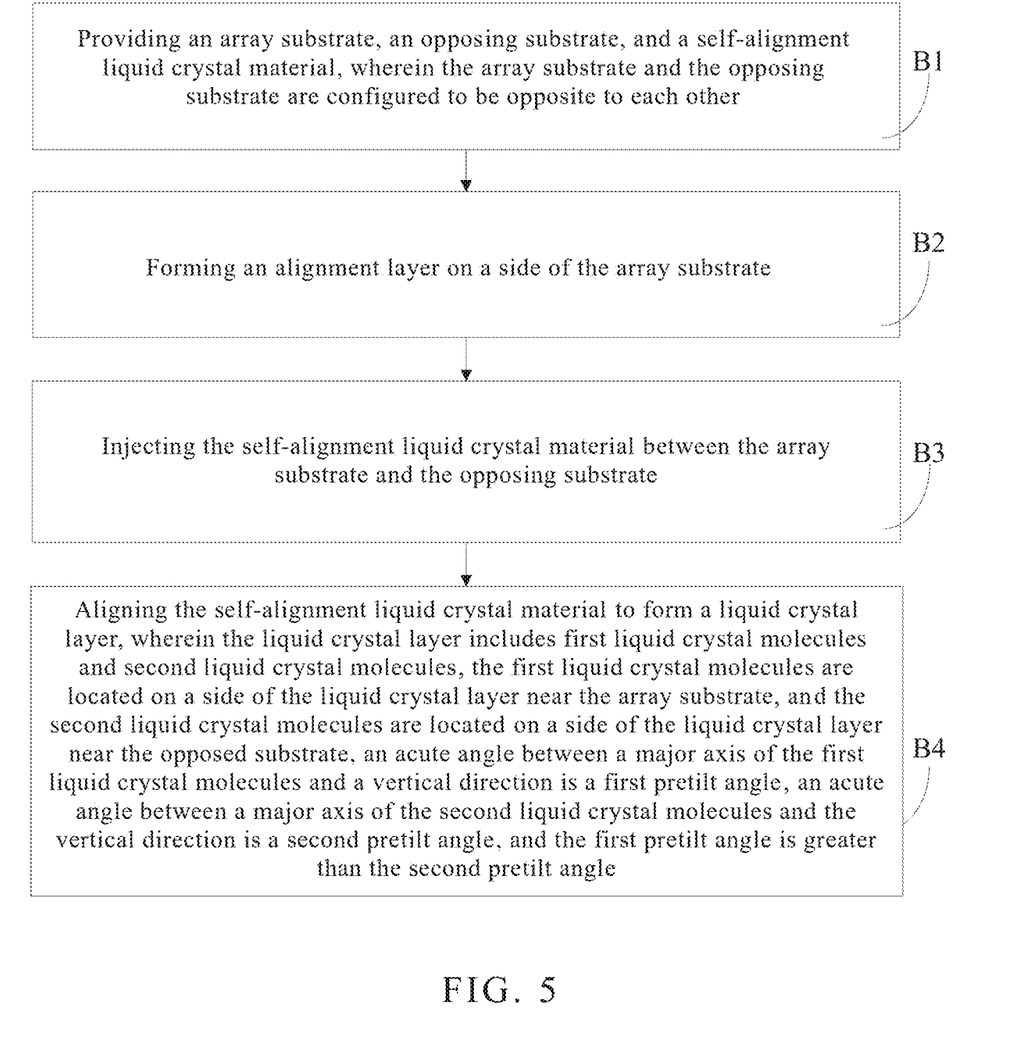
FIG. 5 is a flowchart of a method for manufacturing the liquid crystal display panel of one embodiment of the present application.

The present application also provides a method for manufacturing a liquid crystal display panel, as shown in FIG. 5. The method for manufacturing the liquid crystal display panel includes the steps as follows:

B1, an array substrate, an opposing substrate, and a self-alignment liquid crystal (SA-LC) material are provided. The array substrate and the opposing substrate are disposed opposite to each other.

Specifically, the array substrate is a color filter on array (COA) substrate, the opposing substrate is a substrate without a color filter. The array substrate and the opposing substrate can be fabricated by known technical means.

The SA-LC material is composed of liquid crystal molecules, vertical aligning agents, and reactive monomers. The liquid crystal molecules are nematic liquid crystals. The vertical aligning agents include a structure as shown by formula (1). The reactive monomers include the structure as shown by formula (2). A mass fraction of the vertical aligning agents to the SA-LC material is between 0.3% and 0.6%, and a mass concentration of the reactive monomers in the SA-LC material is between 2000 ppm and 3000 ppm.

B2, an alignment layer is formed on a side of the array substrate.

Specifically, a coating process is employed to coat an alignment material on the side of the array substrate to form the alignment layer. The alignment material of the alignment layer is photo-aligned polyimides. For example, a product model number JSR2579 photo-aligned polyimide (purchased from JSR Co., Ltd.), and the product model number Nissan 4197 or Nissan 867 photo-aligned polyimide (purchased from Nissan Chemical Company, Japan).

B3, the SA-LC material is injected between the array substrate and the opposing substrate.

Specifically, first, a one drop falling (ODF) method is used to inject the SA-LC material between the array substrate and the opposing substrate; then, a frame sealant is applied around the array substrate and/or the opposing substrate, and the array substrate and the opposing substrate are assembled and bonded in a vacuum environment, so that the SA-LC material is enclosed between the array substrate and the opposing substrate; finally, the frame sealant is cured.

B4, the SA-LC material is aligned to form a liquid crystal layer. The liquid crystal layer includes first liquid crystal molecules and second liquid crystal molecules. The first liquid crystal molecules are located on a side of the liquid crystal layer near the array substrate, and the second liquid crystal molecules are located on a side of the liquid crystal layer near the opposing substrate. An acute angle between a major axis of the first liquid crystal molecules and a vertical direction is a first pretilt angle α. An acute angle between a major axis of the second liquid crystal molecules and the vertical direction is a second pretilt angle β. The first pretilt angle α is greater than the second pretilt angle β.

Specifically, under a condition of photo-alignment using irradiation of ultraviolet light of a wavelength of 313 nanometers (nm) and a light intensity of 0.5 milliwatts per square centimeter (mW/cm$^2$), an angular velocity of the first pretilt angle α is greater than an angular velocity of the second pretilt angle, and a difference in degrees between the first pretilt angle α and the second pretilt angle β is greater than 1.8 degrees.

Further, a difference between the angular velocity of the first pretilt angle α and the angular velocity of the second pretilt angle β is greater than 30 seconds per degree. Exemplarily, the SA-LC material is irradiated by the ultraviolet light with the light wavelength of 313 nm and the light intensity of 0.5 mW/cm$^2$ to make the angular velocity of the first pretilt angle α faster than or equal to 40 seconds per degree and the angular velocity of the second pretilt angle β slower than or equal to 70 seconds per degree.

The angular velocity of the second pretilt angle β is preferably in a range between 70 seconds per degree and 130 seconds per degree. On the one hand, the difference in degrees between the first pretilt angle α and the second pretilt angle β should be increased as much as possible to increase an average pretilt angle of all the liquid crystal molecules, so as to improve a response time of the liquid crystal display panel. On the other hand, if the angular velocity of the second pretilt angle β is less than 130 seconds per degree, it has disadvantages of prolonging an alignment period and poor alignment effects.

Further, the first pretilt angle α is between 2.4 degrees and 4 degrees, and the second pretilt angle β is between 0 degrees and 0.6 degrees.

Figure 6:
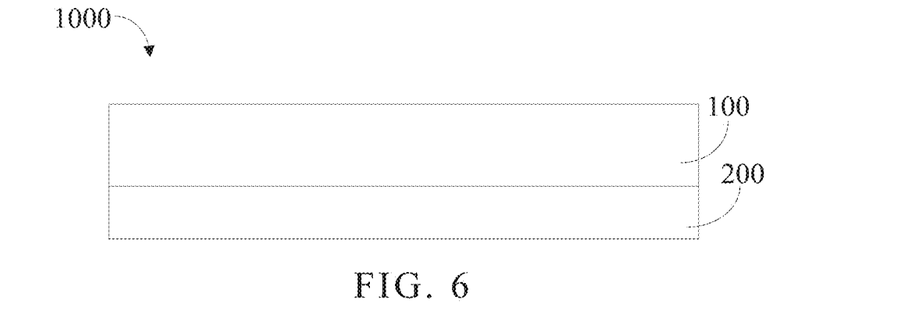
FIG. 6 is a schematic structural view of a curved display of one embodiment of the present application.

The embodiments of the present application provide a curved display as shown in FIG. 6. The curved display 1000 includes a liquid crystal display panel 100 and a backlight module 200. The liquid crystal display panel 100 is any liquid crystal display panel provided in the embodiments of the present application, or the liquid crystal display panel fabricated by the method of manufacturing the liquid crystal display panel provided in the embodiments of the present application. The backlight module 200 is disposed on a side of the liquid crystal display panel 100 away from a light output side. Structure and composition of the light output side can refer to existing curved displays.

The curved display in the embodiments of the present application can be applied to various electronic products with display functions. The electronic products can be any products or components with a display function, for example, mobile phones, computers, digital cameras, digital video cameras, game consoles, audio reproduction devices, information terminals, smart wearable devices, smart weighing electronic scales, car displays, television, etc. The smart wearable devices may be smart bracelets, smart watches, smart glasses, etc.

Experimental Example 1

In an experimental example, six liquid crystal display panels without photo-alignment have participated, and the six liquid crystal display panels correspond to numbers 1 to 6.

Structural composition of numbers 1 to 4 is completely the same, and specific structural composition refers to the liquid crystal display panel disclosed in the embodiments of the present application (as shown in FIG. 3 and FIG. 4). In the numbers 1 to 4, the side of the array substrate near the liquid crystal layer is provided with the alignment layer, and the side of the opposing substrate near the liquid crystal layer is provided without the alignment layer. The material of the alignment layer is fast responsive photo-aligned polyimide (JSR2579). The material of the liquid crystal layer of the numbers 1 to 4 is the self-alignment liquid crystal (SA-LC) material. The SA-LC material is composed of the liquid crystal molecules, the vertical aligning agents, and the reactive monomers. The liquid crystal molecules are nematic liquid crystals. The vertical aligning agents include the structure as shown by formula (1). The reactive monomers include the structure as shown by formula (2). The mass fraction of the vertical aligning agents to the SA-LC material is 0.4%, and the mass concentration of the reactive monomers in the SA-LC material is 3000 ppm. In this experimental example, an only difference between numbers 1 to 4 is that time of the photo-alignment is different.

Numbers 5 and 6 have the same structural composition. Compared to the numbers 1 to 4, the only difference between the numbers 5 and 6 and the numbers 1 to 4 is that the material of the alignment layer is different. The material of the alignment layer of the numbers 1 to 4 is fast responsive photo-aligned polyimide (JSR2579). The material of the alignment layer of the numbers 5 and 6 is slow responsive photo-aligned polyimide (Purchased from JSR Corporation, the product model is JSR2503). In this experimental example, the only difference between the numbers 5 and 6 is that the duration of photo-alignment is different.

The photo-alignment using the irradiation of the ultraviolet light of the wavelength of 313 nm and the light intensity of 0.5 mW/cm$^2$ are performed on the SA-LC material of the numbers 1 to 6. The duration of photo-alignment for the SA-LC material of the numbers 1 to 6 is 40 seconds, 50 seconds, 60 seconds, 80 seconds, 70 seconds, and 80 seconds, respectively. After the photo-alignment for the SA-LC material of the numbers 1 to 6 is completed, the first pretilt angle α, the second pretilt angle β, and the difference in degrees between the first pretilt angle α and the second pretilt angle β of the numbers 1 to 6 are measured respectively. Results are shown in Table 1 below:

TABLE 1

Experimental results of the numbers 1 to 6

| Number | First pretilt angle α (degrees) | Second pretilt angle β (degrees) | Difference in degrees between α and β (degrees) |
| --- | --- | --- | --- |
| 1 | 1.1 | 0.57 | 0.53 |
| 2 | 1.46 | 0.73 | 0.73 |
| 3 | 1.82 | 0.84 | 0.98 |
| 4 | 2.49 | 0.65 | 1.84 |
| 5 | 1.32 | 1.71 | −0.39 |
| 6 | 2.50 | 2.47 | −0.97 |

From the experimental results in Table 1, it can be seen that in the numbers 1 to 4, the first pretilt angle α is greater than the second pretilt angle β. Although the first pretilt angle α and the second pretilt angle β both increase as the duration of photo-alignment extends, extent of an increase of the second pretilt angle β is not as great as extent of an increase of the first pretilt angle α, which makes the difference in degrees between the first pretilt angle α and the second pretilt angle β getting larger. When the duration of photo-alignment reaches 80 seconds, the difference in degrees between the first pretilt angle α and the second pretilt angle β reaches 1.84 degrees, so that the "black clusters" problem is effectively mitigated. For the numbers 5 and 6, the slow responsive photo-alignment material is selected as the material of the alignment layer, and the SA-LC material with the slow angular velocity is used as the material of the liquid crystal layer, which will cause the first pretilt angle α to be smaller than the second pretilt angle β, so that is not conducive to improving the "black clusters" problem.

Experimental Example 2

In an experimental example, three liquid crystal display panels have participated, and the three liquid crystal display panels correspond to numbers 7 to 9.

Structural composition of the numbers 7 to 9 is completely the same, and specific structural composition refers to the liquid crystal display panel disclosed in the embodiments of the present application (as shown in FIG. 3 and FIG. 4). In the numbers 7 to 9, the side of the array substrate near the liquid crystal layer is provided with the alignment layer, and the side of the opposing substrate near the liquid crystal layer is provided without the alignment layer. The material of the alignment layer is fast responsive photo-aligned polyimide (JSR2579).

In the numbers 7 to 9, the material of the liquid crystal layer of is the SA-LC material. The SA-LC material is composed of the liquid crystal molecules, the vertical aligning agents, and the reactive monomers. The liquid crystal molecules are nematic liquid crystals. The vertical aligning agents include the structure as shown by formula (1). The reactive monomers include the structure as shown by formula (2). The photo-alignment using the irradiation of the ultraviolet light of the wavelength of 313 nm and the light intensity of 0.5 mW/cm$^2$ is performed to the SA-LC material of the numbers 7 to 9. The duration of photo-alignment for the SA-LC material of the numbers 7 to 9 is 30 seconds, 60 seconds, and 80 seconds, respectively. In this experimental example, the only difference between the numbers 7 to 9 is that the mass fraction of the vertical aligning agents to the SA-LC material is different, and the mass concentration of the reactive monomers in the SA-LC material is different. Details are as follows:

In number 7, the mass fraction of the vertical aligning agents to the SA-LC material is 0.9% and the mass concentration of the reactive monomers in the SA-LC material is 5000 ppm.

In number 8, the mass fraction of the vertical aligning agents to the SA-LC material is 0.6% and the mass concentration of the reactive monomers in the SA-LC material is 4000 ppm.

In number 9, the mass fraction of the vertical aligning agents to the SA-LC material is 0.4% and the mass concentration of the reactive monomers in the SA-LC material is 3000 ppm.

After the photo-alignment for the SA-LC material of the numbers 7 to 9 is completed, the first pretilt angle α, the second pretilt angle β, and the difference in degrees between the first pretilt angle α and the second pretilt angle β of the numbers 7 to 9 are measured respectively. Results are shown in Table 2 below:

TABLE 2

Experimental results of the numbers 7 to 9

| Number | First pretilt angle α (degrees) | Second pretilt angle β (degrees) | Difference in degrees between α and β (degrees) |
|---|---|---|---|
| 7 | 1.46 | 1.51 | −0.05 |
| 8 | 1.71 | 0.78 | 0.78 |
| 9 | 2.57 | 0.68 | 1.84 |

From the experimental results in Table 2, it can be seen that the number 9 selects the fast responsive photo-alignment material (which makes the angular velocity of the first pretilt angle α faster than 40 seconds per degree) as the material of the alignment layer and the SA-LC material with the slow angular velocity (which makes the angular velocity of the second pretilt angle β slower than or equal to 70 seconds per degree) as the material of the liquid crystal layer to realize that the first pretilt angle α is greater than the second pretilt angle β, the second pretilt angle β is relatively small, and the difference in degrees between the first pretilt angle α and the second pretilt angle β reaches 1.84 degrees, so that the "black clusters" problem is significantly mitigated. In the number 8, although the first pretilt angle α is greater than the second pretilt angle β, the difference in degrees between the first pretilt angle α and the second pretilt angle β is small, so that an improving effect on the "black clusters" problem is limited. In the number 7, the fast responsive photo-alignment material (which makes the angular velocity of the first pretilt angle α faster than 40 seconds per degree) is selected as the material of the alignment layer, and the SA-LC material with the fast angular velocity (which makes the angular velocity of the second pretilt angle β faster than 40 seconds per degree) is selected as the material of the liquid crystal layer, which will cause the first pretilt angle α to be smaller than the second pretilt angle β, so that is not conducive to improving the "black clusters" problem.

Experimental Example 3

In an experimental example, two curved displays have participated, and the two curved displays correspond to numbers 10 and 11. Curvatures of the numbers 10 and 11 are both R1000.

Backlight modules of the numbers 10 and 11 are the same, but liquid crystal display panels of the numbers 10 and 11 are different. Structural composition of the liquid crystal display panel of number 10 refers to the liquid crystal display panel disclosed in the embodiments of the present application (as shown in FIG. 3 and FIG. 4). The material of the alignment layer of the liquid crystal display panel of the number 10 is fast responsive photo-aligned polyimide (JSR2579) and the self-alignment liquid crystal material is the same as the self-alignment liquid crystal material of the number 9 of the experimental example 2. Compared to the number 10, the differences between the numbers 10 and 11 are: 1. layouts of the alignment layers are different; 2. the materials of the alignment layers are different; 3. the materials of the liquid crystal layers are different.

Specifically, in the liquid crystal display panel of number 11, the side of the array substrate near the liquid crystal layer is provided without the alignment layer, and the side of the opposing substrate near the liquid crystal layer is provided with the alignment layer. The material of the alignment layer is the slow responsive photo-aligned polyimide (JSR2503). The material of the liquid crystal layer of the liquid crystal display panel of the number 11 is the same as the material of the liquid crystal layer of the number 7 of the experimental example 2 which makes the liquid crystal molecules located at the side of the liquid crystal layer near the array substrate self-aligned.

The photo-alignment using the irradiation of the ultraviolet light of the wavelength of 313 nm and the light intensity of 0.5 mW/cm$^2$ is performed on the self-alignment liquid crystal (SA-LC) material of the numbers 10 and 11. The duration of photo-alignment for the SA-LC material of the numbers 10 and 11 is both 80 seconds. After the photo-alignment for the SA-LC material of the numbers 10 and 11 is completed, the first pretilt angle α, the second pretilt angle β, and the difference in degrees between the first pretilt angle α and the second pretilt angle β of the numbers 10 and 11 are measured respectively. Results are shown in Table 3 below:

TABLE 3

Experimental results of the numbers 10 and 11

| Number | First pretilt angle α (degrees) | Second pretilt angle β (degrees) | Difference in degrees between α and β (degrees) |
| --- | --- | --- | --- |
| 10 | 2.57 | 0.68 | 1.89 |
| 11 | 1.98 | 1.21 | 0.77 |

Figure 7:
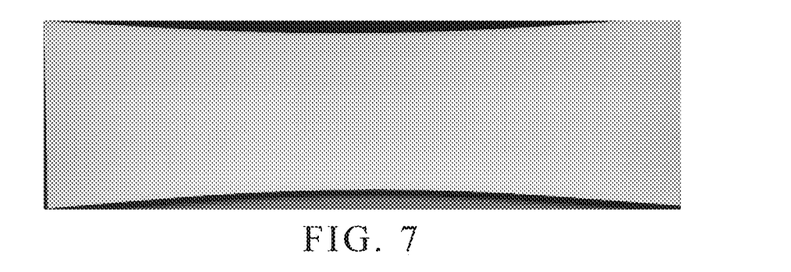
FIG. 7 is a displaying effect view of number 10 curved display in an experiment example 3 of the present application.
Figure 8:
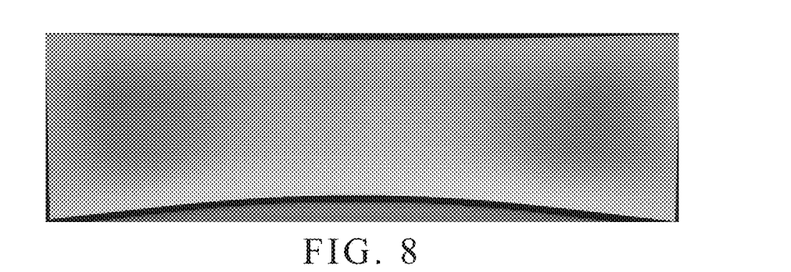
FIG. 8 is a displaying effect view of number 11 curved display in the experiment example 3 of the present application.

According to the experimental results in Table 3, in the numbers 10 and 11, the first pretilt angles α are greater than the second pretilt angles β. The second pretilt angle β of the number 10 is significantly smaller than the second pretilt angle β of the number 11, and the difference in degrees between the first pretilt angle α and the second pretilt angle β in the number 10 is more significant than that in the number 11. The reason for the above difference lies in the fact that the topography of the array substrate is more complicated than that of the opposing substrate. If the alignment layer is not provided on the side of the array substrate near the liquid crystal layer, the liquid crystal molecules on the side near the array substrate will only rely on self-alignment to form a film. The thickness uniformity of the film will be inferior to that of the alignment layer, which will negatively affect the display quality. As shown in FIGS. 7 and 8, when the curved display of the number 10 works, a brightness of each area is the same, and no "black clusters" is generated; in contrast, when the curved display of the number 11 works, the brightness of each area is inconsistent, and there are "black clusters" in regions on both sides.

In the aforementioned embodiments, the description of each embodiment has its own emphasis. For a part that is not described in detail in an embodiment, please refer to the detailed description in other embodiments above, and will not be repeated herein.

A liquid crystal display panel, and a method for manufacturing a liquid crystal display panel, and a curved display provided by the embodiments of the application are described in detail above. In this application, specific examples are used to describe the principles and implementation of the present application. The descriptions of the above examples are only used to help understand the methods and core ideas of the present application; meanwhile, for those skilled in the art, according to ideas of the present application, specific implementations and application scopes will have changes. In summary, the content of this specification should not be construed as limiting the present application.

Accordingly, although the present invention has been disclosed as a preferred embodiment, it is not intended to limit the present invention. Those skilled in the art without departing from the scope of the present invention may make various changes or modifications, and thus the scope of the present invention should be after the appended claims and their equivalents.

What is claimed is:

1. A liquid crystal display panel, comprising:

an array substrate;

an opposing substrate disposed opposite to the array substrate;

a liquid crystal layer made of a self-alignment liquid crystal material and disposed between the array substrate and the opposing substrate, wherein the liquid crystal layer comprises first liquid crystal molecules and second liquid crystal molecules, the first liquid crystal molecules are located on a side of the liquid crystal layer near the array substrate, and the second liquid crystal molecules are located on a side of the liquid crystal layer near the opposing substrate; and an alignment layer only disposed on a side of the array substrate near the liquid crystal layer;

wherein an acute angle between a major axis of the first liquid crystal molecules and a vertical direction is a first pretilt angle, an acute angle between a major axis of the second liquid crystal molecules and the vertical direction is a second pretilt angle, and the first pretilt angle is greater than the second pretilt angle.

2. The liquid crystal display panel of claim 1, wherein a difference in degrees between the first pretilt angle and the second pretilt angle is greater than 1.8 degrees.

3. The liquid crystal display panel of claim 2, wherein the first pretilt angle is between 2.4 degrees and 4 degrees, and the second pretilt angle is between 0 degrees and 0.6 degrees.

4. The liquid crystal display panel of claim 1, wherein the self-alignment liquid crystal material comprises liquid crystal molecules, vertical aligning agents, and reactive monomers, wherein the vertical aligning agents comprise a structure as shown by formula (1):

(1)

and the reactive monomers comprise a structure as shown by formula (2):

(2)

5. The liquid crystal display panel of claim 4, wherein a mass fraction of the vertical aligning agents to the self-alignment liquid crystal material is between 0.3% and 0.6%, and a mass concentration of the reactive monomers in the self-alignment liquid crystal material is between 2000 parts per million (ppm) and 3000 ppm.

6. The liquid crystal display panel of claim 1, wherein the alignment layer is made of polyimide compounds having a main chain based on imides, and the polyimide compounds has a side chain comprising reactive functional groups.

7. The liquid crystal display panel of claim 6, wherein the reactive functional groups comprise at least one of unsaturated double bonds, unsaturated triple bonds, hydroxy groups, or amino groups.

8. A method for manufacturing a liquid crystal display panel,
comprising steps as follows:
providing an array substrate, an opposing substrate, and a self-alignment liquid crystal material, wherein the array substrate and the opposing substrate are disposed opposite to each other;
forming an alignment layer on a side of the array substrate near the opposing substrate;
injecting the self-alignment liquid crystal material between the array substrate and the opposing substrate; and
aligning the self-alignment liquid crystal material to form a liquid crystal layer, wherein the liquid crystal layer comprises first liquid crystal molecules and second liquid crystal molecules, the first liquid crystal molecules are located on a side of the liquid crystal layer near the array substrate, the second liquid crystal molecules are located on a side of the liquid crystal layer near the opposing substrate, an acute angle between a major axis of the first liquid crystal molecules and a vertical direction is a first pretilt angle, and an acute angle between a major axis of the second liquid crystal molecules and the vertical direction is a second pretilt angle;
wherein the first pretilt angle is greater than the second pretilt angle.

9. The method for manufacturing the liquid crystal display panel of claim 8, wherein the step of aligning the self-alignment liquid crystal material to form the liquid crystal layer comprises: irradiating the self-alignment liquid crystal material by ultraviolet light to facilitate an angular velocity of the first pretilt angle to be faster than an angular velocity of the second pretilt angle.

10. The method for manufacturing the liquid crystal display panel of claim 9, wherein irradiating the self-alignment liquid crystal material by the ultraviolet light is performed under conditions of a light wavelength between 270 nanometers and 380 nanometers, and a light intensity between 0.5 milliwatts per square centimeter and 0.7 milliwatts per square centimeter.

11. The method for manufacturing the liquid crystal display panel of claim 10, wherein a difference between the angular velocity of the first pretilt angle and the angular velocity of the second pretilt angle is greater than or equal to 30 seconds per degree.

12. The method for manufacturing the liquid crystal display panel of claim 11, wherein the self-alignment liquid crystal material is irradiated by the ultraviolet light with a light wavelength of 313 nanometers and the light intensity of 0.5 milliwatts per square centimeter to make the angular velocity of the first pretilt angle faster than or equal to 40 seconds per degree and the angular velocity of the second pretilt angle slower than or equal to 70 seconds per degree.

13. A curved display, comprising:
a liquid crystal display panel; and
a backlight module disposed on a side of the liquid crystal display panel away from a light output side;
wherein the liquid crystal display panel comprises:
an array substrate;
an opposing substrate disposed opposite to the array substrate;
a liquid crystal layer made of a self-alignment liquid crystal material and disposed between the array substrate and the opposing substrate, wherein the liquid crystal layer comprises first liquid crystal molecules and second liquid crystal molecules, the first liquid crystal molecules are located on a side of the liquid crystal layer near the array substrate, and the second liquid crystal molecules are located on a side of the liquid crystal layer near the opposing substrate; and
an alignment layer only disposed on a side of the array substrate near the liquid crystal layer;
wherein an acute angle between a major axis of the first liquid crystal molecules and a vertical direction is a first pretilt angle, an acute angle between a major axis of the second liquid crystal molecules and the vertical direction is a second pretilt angle, and the first pretilt angle is greater than the second pretilt angle.

14. The curved display of claim 13, wherein a difference in degrees between the first pretilt angle and the second pretilt angle is greater than 1.8 degrees.

15. The curved display of claim 14, wherein the first pretilt angle is between 2.4 degrees and 4 degrees, and the second pretilt angle is between 0 degrees and 0.6 degrees.

16. The curved display of claim 13, wherein the self-alignment liquid crystal material comprises liquid crystal molecules, vertical aligning agents, and reactive monomers, wherein the vertical aligning agents comprise a structure as shown by formula (1):

(1)

and the reactive monomers comprise a structure as shown by formula (2):

(2)

17. The curved display of claim 16, wherein a mass fraction of the vertical aligning agents to the self-alignment liquid crystal material is between 0.3% and 0.6%, and a mass concentration of the reactive monomers in the self-alignment liquid crystal material is between 2000 parts per million (ppm) and 3000 ppm.

18. The curved display of claim 13, wherein the alignment layer is made of polyimide compounds having a main chain based on imides, and the polyimide compounds has a side chain comprising reactive functional groups.

19. The curved display of claim 18, wherein the reactive functional groups comprise at least one of unsaturated double bonds, unsaturated triple bonds, hydroxy groups, or amino groups.

* * * * *